J. W. WATKINS.
COTTON PICKING SACK.
APPLICATION FILED MAY 7, 1918.
1,300,065.
Patented Apr. 8, 1919.
2 SHEETS—SHEET 1.
Fig. 1.
Fig. 2.
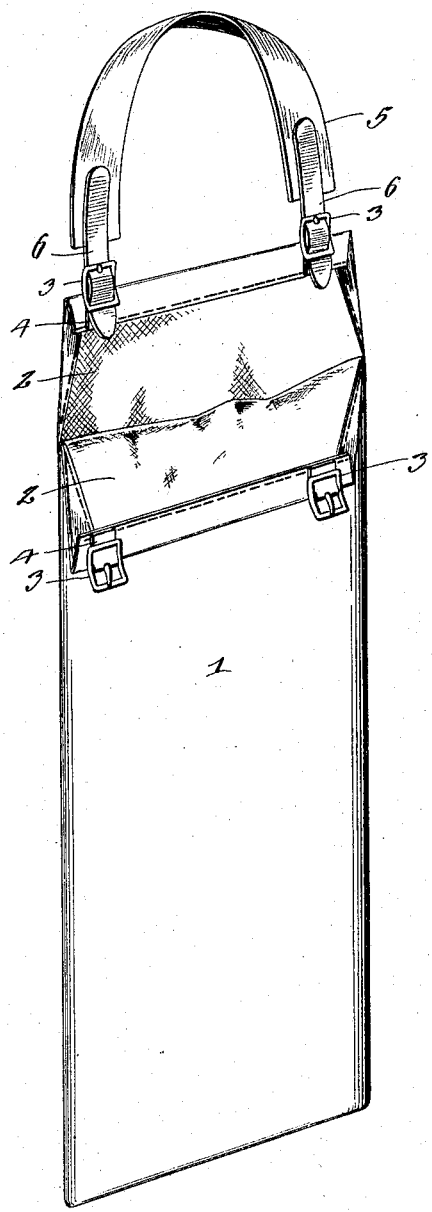
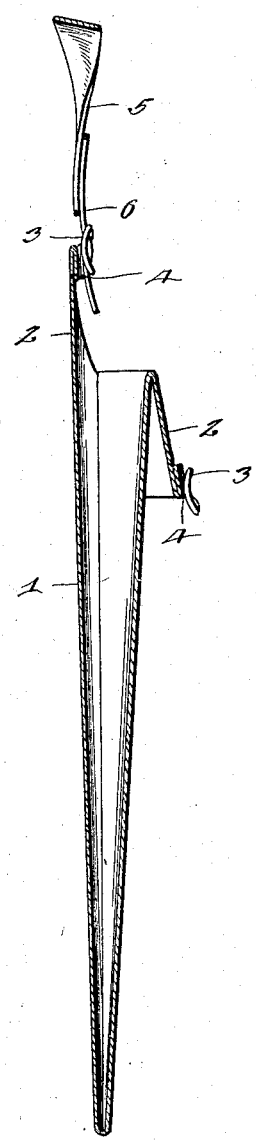
Witnesses
Inventor
J. W. Watkins,
By Victor J. Evans
Attorney J. W. WATKINS.
COTTON PICKING SACK.
APPLICATION FILED MAY 7, 1918.
1,300,065.
Patented Apr. 8, 1919.
2 SHEETS—SHEET 2.
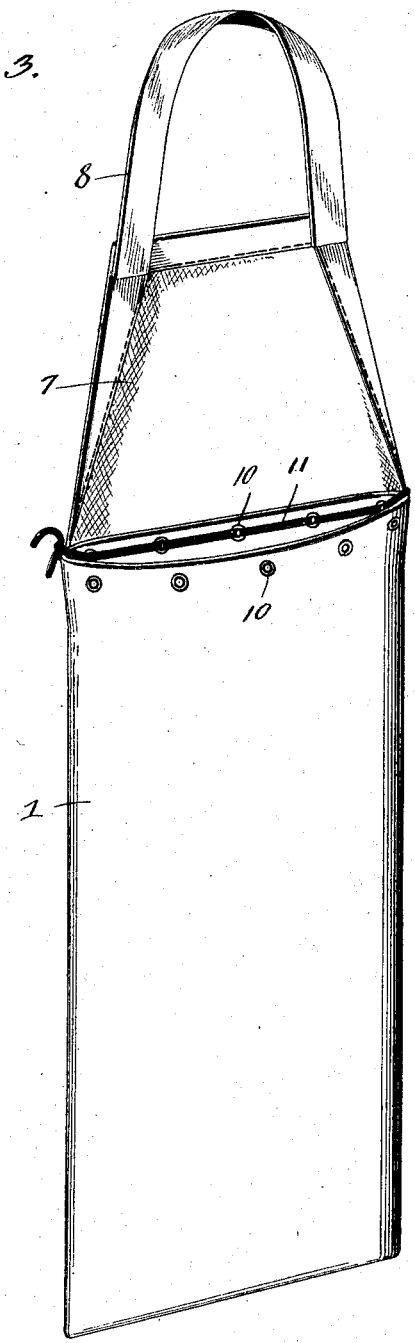
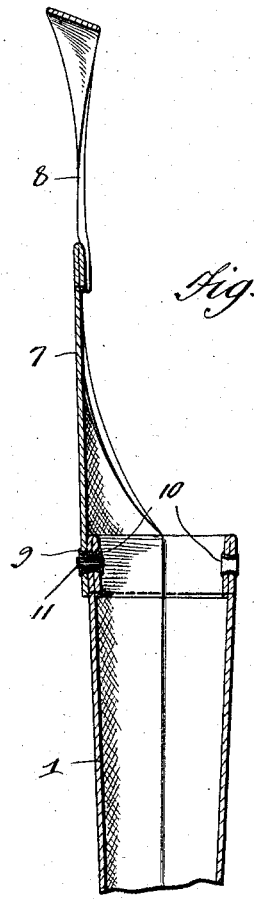

UNITED STATES PATENT OFFICE.

JOSEPH WILLIAM WATKINS, OF RIDGELY, TENNESSEE, ASSIGNOR OF ONE-HALF TO GORDON GRIFFIN AND HENRY W. BARTLEY, BOTH OF RIDGELY, TENNESSEE.

COTTON-PICKING SACK.

1,300,065.  Specification of Letters Patent.  Patented Apr. 8, 1919.

Application filed May 7, 1918. Serial No. 233,130.

*To all whom it may concern:*

Be it known that I, JOSEPH W. WATKINS, a citizen of the United States, residing at Ridgely, in the county of Lake and State of Tennessee, have invented new and useful Improvements in Cotton-Picking Sacks, of which the following is a specification.

This invention relates to improvements in sacks such as are used by cotton pickers to receive the cotton lint as the same is picked from the bolls, in the field, the object of the invention being to provide an improved sack of this character which can be reversed and arranged to drag between the cotton rows with either side on the ground so that the durability of the sack is very greatly increased.

The invention also has for a specific object the provision of a cotton sack carrying flaps on opposite sides of its mouth and to either of which the shoulder strap used by the cotton picker can be attached so that the sack can be reversed and either side thereof arranged on the ground for dragging between the cotton rows as the picking proceeds.

The invention also has for its object the provision of a carrying flap which is suspended from the shoulder of the user and to which either side of the sack can be detachably connected so that the sack can be reversed and its durability very greatly increased.

With the above and other objects in view, the invention consists in the construction, combination and arrangement of devices hereinafter described and claimed.

In the accompanying drawings:—

Figure 1 is a perspective view of a cotton picker sack provided with a pair of integral suspending flaps at opposite sides of its mouth and also provided with means for attaching either of the suspending flaps to the shoulder strap in accordance with my invention.

Fig. 2 is a detail sectional view of the same.

Fig. 3 is a perspective view of a cotton picker sack provided with a detachable and reversible carrying flap and constructed and arranged in accordance with a modification of my invention.

Fig. 4 is a detail sectional view of the same.

In the form of my invention shown in Figs. 1 and 2 the sack 1 is formed with integral carrying flaps 2 at opposite sides of its mouth and each carrying flap is provided near its ends with buckles 3 which are attached thereto by suitable tabs 4.

I also provide a shoulder strap 5 which may be of any suitable material, such, for instance, as the cotton webbing material which is used for making the back-straps of plow harness, and to the ends of said shoulder strap are permanently secured attaching straps 6, which are preferably made of leather, but can be made of any suitable material, said attaching straps being adapted to be engaged with the buckles of either of the carrying flaps 2 and so that the sack, which is dragged on the ground between the rows as the cotton is picked, can be arranged with either side undermost and hence can be reversed when it becomes worn on one side and continued in use until the other side also is worn, thus practically doubling the life of the sack and correspondingly economizing in the cost thereof.

In the form of my invention shown in Figs. 3 and 4 the sack is used in connection with a carrying flap 7 which carrying flap is detachable from the sack and is provided with a strap 8 which enables the carrying flap to be suspended from the shoulder of the user.

The carrying flap is provided at the lower side with eyelets 9 and the sack is provided at the mouth, on opposite sides, with eyelets 10 either set of which may be arranged in registry with the eyelets 9. A lacing cord 11 is run through the eyelets 9, 10 and serves to detachably secure either side of the mouth of the sack to the carrying flap and hence the sack can be reversed and used until both sides thereof are worn.

It will be observed that in both forms of my invention the carrying flap forms an extension of the side of the sack to which it is attached and is smooth and unobstructed so that the comfort of the user is greatly promoted. Cotton is ordinarily picked in hot weather and the cotton picking hands necessarily clothe themselves very lightly and it is of great practical importance that the sack with its load of cotton should not gall or annoy the user. Both forms of my invention meet this requirement while allowing the sack to be reversed and used until both sides thereof are worn.

Having thus described my invention, I claim:—

A cotton picking sack and a carrying flap therefor, detachable therefrom, said sack and flap having means whereby the flap can be attached to either side of the sack to form an extension of said side and so that the sack can be reversed and said flap having a strap loop, at its upper end, to enable the same to be suspended from the shoulder of the user.

In testimony whereof I affix my signature.

JOSEPH WILLIAM WATKINS.

Copies of this patent may be obtained for five cents each, by addressing the "Commissioner of Patents, Washington, D. C."